Figure 1:
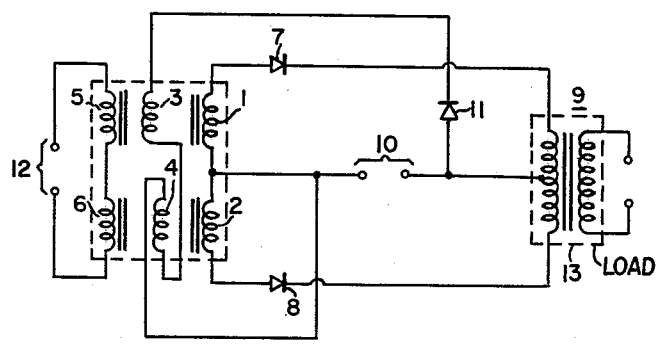

April 28, 1964

L. O. LUNDAHL 3,131,360

MAGNETIC AMPLIFIER

Filed Oct. 19, 1960

INVENTOR
LARS OLOF LUNDAHL

BY *Lackey and Taylor*

ATTORNEYS 3,131,360
MAGNETIC AMPLIFIER
Lars Olof Lundahl, Lidingo, Sweden, assignor to Svenska Aktiebolaget Gasaccumulator, Lidingo, Sweden, a corporation of Sweden
Filed Oct. 19, 1960, Ser. No. 63,544
Claims priority, application Sweden Oct. 27, 1959
2 Claims. (Cl. 330—8)

The present invention relates to a magnetic amplifier which may be used, for instance, to supply current to a control motor.

A control motor which is used to drive a member to be controlled often takes the shape of a two-phase induction motor, one of the phases of which is fixed and is driven by a constant alternating voltage and the other phase of which forms the control phase which is driven from an amplifier supplying a voltage of variable magnitude. The fixed phase and the control phase should have a phase difference of 90°. In some control systems it is desirable for the motor to rotate in both directions, which is achieved by making the amplifier bilateral so as to enable it to deliver a voltage which is either 90° before or 90° behind the fixed phase. As amplifiers there have been employed most of the known types, such as vacuum tube, thyratron, magnetic transductor and transistor amplifiers.

A magnetic amplifier comprises one or more saturable reactors and diodes. A saturable reactor in the present connection means a reactor having a core which can be driven to saturation. The basic circuit arrangement which can be considered as a building element of all magnetic amplifiers consists of a saturable reactor in series with a diode. The saturable reactor has a closed core of a material having marked saturation characteristics.

If such a basic circuit arrangement is connected in series with a resistive load and a voltage source, and a control voltage is applied across the diode, it can be shown that, apart from the signs, the average value of the output voltage across the resistive load is equal to the average value of the voltage across the diode. When the control is applied across the diode, the voltage gain factor is therefore 1. The alternating voltage from the voltage source produces in such an arrangement an operative interval during which the diode is conductive and a control interval intervening between the operative intervals. The current gain factor is the ratio of maximum current by which the winding can be loaded during the operative interval to the current during the control interval. The last mentioned current is delivered by the control voltage source and is dependent in its magnitude on the current required for the reenergization of the reactor. For a modern saturable reactor this ratio may be several hundred.

The magnetizing curve, which shows the relationship between induction and field strength, is characterized for a modern material by steep flanks and a sharp transition to the saturation range. During the control interval referred to, the magnetic state is altered in a manner corresponding to a movement downwards on the left hand branch of the magnetizing curve. The induction has dropped off at the end of the control period to a value corresponding to the integrated supply voltage minus integrated diode voltage. Normally, a control is arranged to magnetize the core by means of a bias circuit to an induction value corresponding to a certain operating point on the steep portion of the magnetizing curve. The control circuit may then cooperate with or counteract the bias circuit and owing to the steepness of the curve an exceedingly high gain factor is achieved.

The magnetizing curve is however not entirely invariable but may change, particularly with temperature. The influence of temperature on the magnetizing curve may result in a narrowing or a broadening of the curve at the same time as its general characteristics are not altered. Especially if the magnetizing curve is broadened with increasing temperature, which occurs in impregnated coils at high temperatures, such instability causes difficulties. If the biasing current is constant, as is true of a normal high-resistance biasing circuit, a broadening of the magnetizing curve leads to a smaller decrease in induction and consequently to a larger operating current, which in its turn leads to an increased heat development in the winding and therefore to a further broadening of the magnetizing curve. The condition is thermally unstable and the result is thermal runaway.

A further drawback which makes itself felt in a normally high-resistance biasing circuit is that each sample of saturable reactor requires individual adjustment of the biasing current.

If the biasing circuit is instead made to have a low resistance, which implies that there is applied to the reactor a certain voltage integral during the control interval, the operating point is fixed in position but on the other hand the control of the transductor is rendered difficult and the gain factor goes down, since the biasing circuit tends to shunt the control circuit. The actual gain factor will therefore depend on the stability of the magnetizing curve with regard to the climatic changes actually taking place.

The disadvantages just referred to are obviated according to the invention by means of a bilateral magnetic amplifier, which makes it possible to use with advantage a very low resistance biasing circuit, which may for instance comprise no series resistor. Preferably, the arrangement is such that operating winding and biasing winding of the reactor are for the greatest part identical, whereby a saving in space requirements is possible, which is of great value in the present case.

The invention will be described below with reference to the attached drawing, FIGURE 1 of which shows a bilateral one-way magnetic amplifier and FIGURE 2 of which shows a bilateral two-way magnetic amplifier.

In the FIG. 1 arrangement, the magnetic amplifier has a pair of operating windings 1 and 2, a pair of biasing windings 3 and 4 and a pair of control windings 5 and 6. Each operating winding is in series with a rectifier 7 or 8, respectively, and a load, which may comprise the primary of a transformer 9, which is connected to a pair of terminals 10 for the application of alternating voltage. The rectifiers 7 and 8 have such polarities that half periods of the applied alternating voltage with a certain direction passes through both rectifiers, whereas the opposite half periods are suppressed by both rectifiers. From the terminals 10 there is furthermore taken off via an additional rectifier 11 a voltage to the two series-connected biasing windings 3 and 4. The rectifier 11 is of such polarity as to pass those half periods of the alternating voltage which would be blocked by the rectifiers 7 and 8. Using the same terminology as before, the operative interval is that during which the rectifiers 7 and 8 are conductive, whereas the control interval is that during which the rectifier 11 passes current. As indicated on the drawing, the biasing windings have furthermore the opposite winding directions relative to the windings 1 and 2, the result of which is that a control voltage which is applied via the terminals 12 to the control windings 5 and 6 will produce according to its direction a current in either one of the two halves of the primary of transformer 9. In this way, the arrangement may produce a control phase which is either 90° leading or 90° lagging relative to a fixed phase.

In the arrangement shown, the number of the winding turns are selected so as to make the sum of the downward control, i.e. the abovementioned downward movement on the left-hand branch of the magnetizing curve, have the desired value. The difference in downward control between the two sides may be influenced by the control windings 5 and 6. The current that a control voltage source connected to the terminals 12 should be able to supply is determined by the slope of the magnetizing curve and by the indeterminateness of the difference between the magnetizing currents for the two reactors. This indeterminateness, however, is much smaller than that of the magnetizing curves regarded separately. This makes it possible to utilize a high gain factor, even if the arrangement is exposed to large temperature variations, which, as was mentioned above, result in changes in the width of the magnetizing curves.

A more detailed study of the FIG. 1 arrangement shows that the real control represented by the difference in integrated voltage taken up by the reactors is limited and dependent on the integrated voltage across the load during the control interval. For a full control of the magnetic amplifier it is therefore suitable for the load to comprise a tuned circuit which maintains a voltage across the load also during the control interval. For this reason also, the operating point cannot be selected entirely in class B but has to be somewhat moved in the direction of class A operation, since the magnetic amplifier must have a certain initial control range which produces a certain output voltage which in its turn widens the control range.

The degree of control that is obtainable with a bilateral one-way magnetic amplifier having a low resistor biasing circuit, such as in accordance with FIG. 1, is dependent in the manner pointed out above on the integrated output voltage during the control interval. Of importance also is the Q of the load as a tuned circuit. However, there may be difficulties in obtaining a sufficiently high Q. To obviate this disadvantage, the amplifier may be made bilateral. This implies that two one-way magnetic amplifiers are connected to the same load in such a way that one is in its control interval when the other is in its operative interval. In this manner, each half of the amplifier will have a voltage present across the load during the control interval.

Figure 2:
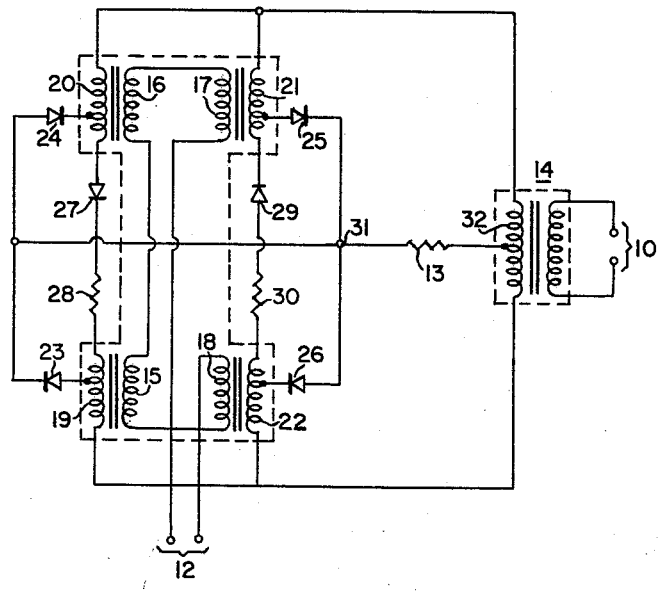

FIG. 2 shows an embodiment of a bilateral two-way magnetic amplifier which is connected to a load 13. Alternating voltage is applied across the terminals 10 and a transformer 14 having a centre-tapped secondary. The magnetic amplifier possesses control windings 15, 16, 17 and 18, to which is supplied a control voltage across the terminals 12. Furthermore, the amplifier has operating windings and biasing windings, which are for the greater part common in that the whole of the windings 19, 20, 21 and 22 are biasing windings, whereas those portions of these windings that are between the ends of the secondary of the transformer 14 and the tappings on the windings 19, 20, 21 and 22 serve as operating windings. To this end, rectifiers 23, 24, 25 and 26 are connected between the tappings and one end of the load, the windings 19 and 20 being connected via a rectifier 27 and a resistor 28 and the windings 21 and 22 being similarly connected via a rectifier 29 and a resistor 30.

Depending on the direction of the voltage induced in the secondary of the transformer 14, a biasing current will flow either through the rectifier 27 and the windings 19 and 20 or through the rectifier 29 and the windings 21 and 22. The portion of the magnetic amplifier which is thus supplied with a biasing current has its control interval during that time. The other portion of the magnetic amplifier, which during the same interval is not supplied with biasing current, then has its operating interval, the operating current flowing through this portion of the amplifier being then dependent on the control current during the immediately preceding interval. As a result of this, the current flowing through the load 13 will be determined as to its phase and its amplitude by the control voltage applied to the terminals 12.

If it is thus assumed that the voltage induced in the secondary of the transformer 14 during a certain half-period is of such direction as to make a biasing current flow through the rectifier 27 and the windings 19 and 20, operating current will flow through the winding 21 and the rectifier 25 when the control voltage applied to the terminals as a predetermined phase relation relative to the voltage applied to the terminals 10. During the subsequent half-period, when a biasing current flows through the rectifier 29 and the windings 21 and 22, an operating current will flow through the winding 20 and the rectifier 24, which implies that the upper half of the secondary of the transformer 14 shown on the drawing will supply to the load 13 an alternating current, the phase of which is constant as long as the phase relation between the voltages applied to the terminals 10 and 12 remains unchanged. On the other hand, if the phase of the control voltage applied to the terminals 12 is reverted, this causes the rectifiers 23 and 26 and the corresponding windings 19 and 22 to conduct individual half-periods of the operating current, so that the load 13 is supplied from the lower half of the secondary of the transformer 14 according to the drawing. A phase reversal of the alternating current flowing through the load 13 can therefore be obtained, making this current lead or lag the fixed reference phase by 90° depending upon the phase of the control voltage.

The drawing shows resistors 28 and 30, which may be inserted in the biasing circuits. These resistors, however, can also be omitted, since it is of essential importance that each biasing circuit, when reduced to its equivalent resistance in the control circuit, is of a low resistance relative to the latter. Such a proportioning is possible without incurring a decrease in the gain factor by making the magnetic amplifier bilateral according to the invention.

A further advantage which is obtained by making the biasing circuit have a low resistance is the prevention of the bothersome phenomenon of choking. Such choking may present itself when an A.C. signal is used for the control and causes a magnetic amplifier which has a large choking signal applied to it exhibit instead a rise in amplification. The reason for this is that a choking signal which causes the diode to become conductive during the control interval supplies a backward voltage to the diode in the initial phase of the operating interval. This gives rise to a diode voltage and therefore also to an output voltage. As was mentioned, this is obviated by the use of a low-resistance biasing circuit owing to the fact that the sum of the changes in induction in the two reactors of a bilateral amplifier is limited also during the operating interval.

What is claimed is:

1. Magnetic amplifier assembly for controlling the phase and the amplitude of an alternating current supplied from a source of alternating current to a load comprising a source of alternating current having a pair of terminals; a load including at least a center-tapped impedance having two end terminals; two single-sided magnetic amplifiers each comprising at least one saturable reactor core means, and operating winding, a biasing winding and a control winding each on said core means; one end of each operating winding being connected to one of said pair of terminals of said source of alternating current and the other end of each operating winding being separately connected in series, respectively, with a first rectifier and said one of the end terminals of the impedance, respectively; the center-tap of said impedance being connected to the other of said pair of terminals of said source of alternating current; said biasing windings being mutually series-connected having one end thereof connected to said one of the pair of terminals of said source of alternating current and the other end thereof connected in series with a further rectifier and connected to said other of the pair of terminals of said source of alternating current to form a biasing circuit, a pair of control terminals, a connection between one end of each of said control windings to arrange the control windings in series, conductors for connecting one of the pair of control terminals respectively with one of the other ends of the control windings so that the control terminals and the control windings form a loop when a source of control voltage is connected to the control terminals, said first rectifier and said further rectifier being oppositely poled with respect to each other in circuit relation whereby said operating windings and said biasing windings alternately conduct on successive half cycles of said alternating current, said biasing circuit having a low internal resistance compared with the internal resistance of the control circuit.

2. Magnetic amplifier assembly for controlling the phase and the amplitude of an alternating current supplied from a source of alternating current to a load comprising:

a source of alternating current having a secondary winding including at least a center tap and having a pair of end terminals;

a load having a pair of terminals;

four magnetic amplifiers each comprising at least one saturable reactor core means, a common operating-biasing winding and a control winding each on said core means;

a tap medially disposed on each of the common windings;

one end of two of said common windings being connected to one of the end terminals of said source of alternating current, and one end of the other two common windings being connected to the other of the end terminals of said source of alternating current;

rectifiers connecting each said tap of the common winding separately to one of the end terminals of said load to form an operating circuit;

the center tap of said source being connected to the other of said pair of terminals of said load;

pairs of said common windings being mutually series-connected having the other end terminals thereof connected to the other of said pair by a further rectifier to form a biasing circuit, and forming pairs of said magnetic amplifiers;

a pair of control terminals;

a connection between one end of each of said control windings to arrange the control windings in series;

conductors for connecting each one of the control terminals respectively with the control windings so that the control terminals and the control windings form a loop when a source of control voltage is connected to the control terminals;

said first rectifier and said further rectifier of each pair of magnetic amplifiers being oppositely poled with respect to each other in circuit relation whereby said operating windings and said biasing windings alternately conduct on successive half-cycles of said alternating current, said biasing circuit having a low internal resistance compared with the internal resistance of the control circuit;

said rectifiers of said pair of magnetic amplifiers being oppositely poled with regard to corresponding rectifiers of the other magnetic amplifier, whereby said operating windings of said one pair of magnetic amplifiers and said operating windings of said other pair of magnetic amplifiers conduct and pass to said load alternately successive half cycles of said alternating current.

References Cited in the file of this patent

UNITED STATES PATENTS

| | | |
|---|---|---|
| 2,341,526 | Breitenstein | Feb. 15, 1944 |
| 2,919,395 | Schohan | Dec. 29, 1959 |
| 2,933,672 | Jones | Apr. 19, 1960 |
| 2,948,844 | Morgan | Aug. 9, 1960 |